(12) United States Patent
Weng et al.

(10) Patent No.: US 11,807,790 B2
(45) Date of Patent: Nov. 7, 2023

(54) PHOTOLUMINESCENCE MATERIAL AND PRODUCTION METHOD THEREOF

(71) Applicant: National Taiwan University of Science and Technology, Taipei (TW)

(72) Inventors: Ren-Jie Weng, Kaohsiung (TW); Wei-Hung Chiang, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 289 days.

(21) Appl. No.: 17/378,869

(22) Filed: Jul. 19, 2021

(65) Prior Publication Data
US 2022/0298412 A1  Sep. 22, 2022

Related U.S. Application Data

(60) Provisional application No. 63/163,173, filed on Mar. 19, 2021.

(51) Int. Cl.
| | |
|---|---|
| *C09K 11/65* | (2006.01) |
| *C01B 32/184* | (2017.01) |
| *B29B 17/04* | (2006.01) |
| *B82Y 20/00* | (2011.01) |
| *B82Y 30/00* | (2011.01) |
| *B82Y 40/00* | (2011.01) |

(52) U.S. Cl.
CPC .............. *C09K 11/65* (2013.01); *B29B 17/04* (2013.01); *C01B 32/184* (2017.08); *B29B 2017/0424* (2013.01); *B82Y 20/00* (2013.01); *B82Y 30/00* (2013.01); *B82Y 40/00* (2013.01); *C01B 2204/22* (2013.01); *C01B 2204/32* (2013.01); *C01P 2004/64* (2013.01); *C01P 2006/60* (2013.01)

(58) Field of Classification Search
CPC ....... C09K 11/65; C01B 32/184; B29B 17/04; B29B 2017/0424
See application file for complete search history.

(56) References Cited

U.S. PATENT DOCUMENTS 10,124,327 B2 * 11/2018 Chiang .................. B01J 37/349

FOREIGN PATENT DOCUMENTS

CN  109776857 A  5/2019

* cited by examiner

*Primary Examiner* — C Melissa Koslow

(57) ABSTRACT

The present invention is related to a production method of a photoluminescence material by micro-plasma treatment for degrading plastic piece into multiple smaller molecular, a graphene quantum dot and the composite thereof. By using micro-plasma treatment, the production method provided by the present invention consumes very little energy and the processing steps is simple and efficiency without the existence of any organic solvent. The products obtained by the said treatment is high valued graphene quantum dot and graphene quantum dot composite with excellent photoluminescence ability for at least white, blue, green, cyan or yellow colors.

11 Claims, 24 Drawing Sheets

CIE 1931

Fig. 4C

CIE 1931

Fig. 4D

PHOTOLUMINESCENCE MATERIAL AND PRODUCTION METHOD THEREOF

FIELD OF INVENTION

The present invention generally relates to a photoluminescence material, and more particularly it relates to a photoluminescence material produced by degrading a plastic waste and production method thereof.

The present invention has been developed primarily to be a material with photoluminescence ability with the most promising white and blue photoluminescence effects by degrading the plastic waste using plasma treatment for describing hereinafter with references and multiple embodiments to this application. However, it will be appreciated that the present invention is not limited to this particular method, field of use or effect.

BACKGROUND OF THE INVENTION

Plastic products nowadays become a most commonly used products within our daily life. It covers enormous ranges of use from household items, daily necessities or even industrial or high technology products. However, on the opposite side of plastic products bring us a more convenient and better life, there's a problem for the disposal of plastic waste at the meanwhile impacting both of human health and environment. How to deal with such large amount of plastic wastes has becoming a popular topic among academia circles and industrial fields.

To deal with plastic wastes, two main practices are available from the conventional methods, such as landfill disposal and incineration method. Further accompanying by soil contamination and air pollutions have proved that these two options are not ideal ways for disposal the said plastic waste. Although it is still possible for some recyclable plastics to be re-introduced to manufacture processing, the quality of these recycle plastic products make them only suitable for secondary or inferior product markets which the production cost is hardly covered by the selling price of these recycle plastic product. The disposal of plastic waste seems facing a difficult situation.

As technology developing rapidly, certain approaches for making the plastic waste degrading into re-applicable little compounds have drawn more and more attention in the fields. Taking enforced by strong acid, alkali solvent or enzyme, the high crosslinked polymer molecules of the plastic waste are possible to be degraded into little piece as monomers, oligomers or derivatives. However, the said approach still requires to be compensated for better results by pretreatments as breaking the plastic wastes into smaller and easier to handle pieces. If the plastic products are made by crystalline plastics material, the degradation process might become more complicated to achieve. Not to mention the high production costs, time-consuming degradation process and post recycling of strong acid and alkali solvents for such kind of treatments also cause so much troublesome in actual practice. Hence, it is eager to have a solution which could solve the problem of plastic waste disposal and also could produce valuable products that will overcome or substantially ameliorate at least one or more of the deficiencies of a prior art, or to at least provide an alternative solution to the problems. It is to be understood that, if any prior art information is referred to herein, such reference does not constitute an admission that the information forms part of the common general knowledge in the art.

SUMMARY OF THE INVENTION

In order to solve shortcomings of conventional techniques for dealing with plastic waste, the present invention is required.

According to a first aspect of the present invention, a production method of a photoluminescence material comprising step of: placing a plastic piece into a working solution, and the working solution is water; applying a micro-plasma onto a surface of the working solution; and degrading the plastic piece into multiple smaller molecule and a graphene quantum dot.

In accordance, the second aspect of the present invention, a photoluminescence material comprises a smaller molecule degraded from a plastic piece by micro-plasma treatment; a graphene quantum dot; and a graphene quantum dot composite comprises the smaller molecule and the graphene quantum dot.

In accordance, the present invention has the following advantages:

By using micro-plasma treatment, the production method provided by the present invention consumes very little energy and the processing steps is simple and efficiency. The micro-plasma treatment is able to degrade the plastic piece without the existence of any organic solvent like strong acid or alkali for various kinds of plastic material, especially to the crystalline plastics which is considered hard to be degraded by the conventional technique. The present invention provides a solution or makes a huge improvement for disposal of the plastic waste.

The products degraded from the plastic waste treated by the micro-plasma treatment provided by the present invention comprise high valued graphene quantum dot and graphene quantum dot composite with excellent photoluminescence ability for white, blue, green, cyan or yellow colors. The present invention is an evolution to the conventional disposal system for plastic waste not only can improve the recycling rate but also product valuable products for photoluminescence applications. Many of the attendant features and advantages of the present invention will become better understood with reference to the following detailed description considered in connection with the accompanying figures and drawings.

BRIEF DESCRIPTION OF THE DRAWINGS

The steps and the technical means adopted by the present invention to achieve the above and other objects can be best understood by referring to the following detailed description of the preferred embodiments and the accompanying drawings.

Figures 4C, 4D:
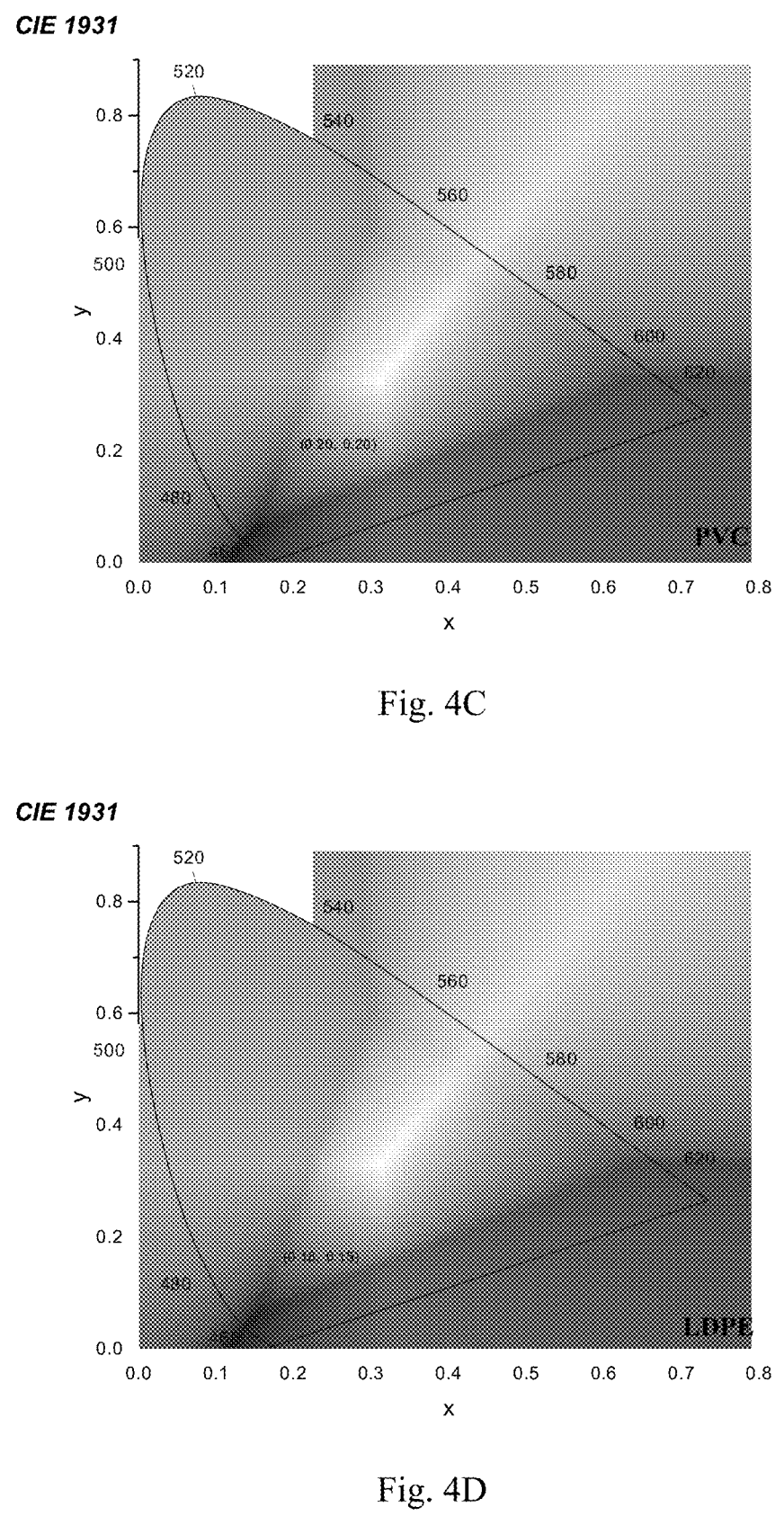

FIGS. 4A to 4H are CIE chromaticity coordinates of samples No. 21 to 28 degraded from different plastic piece in accordance to the present invention;

DETAILED DESCRIPTION OF THE PREFERRED EMBODIMENTS

Figure 1:
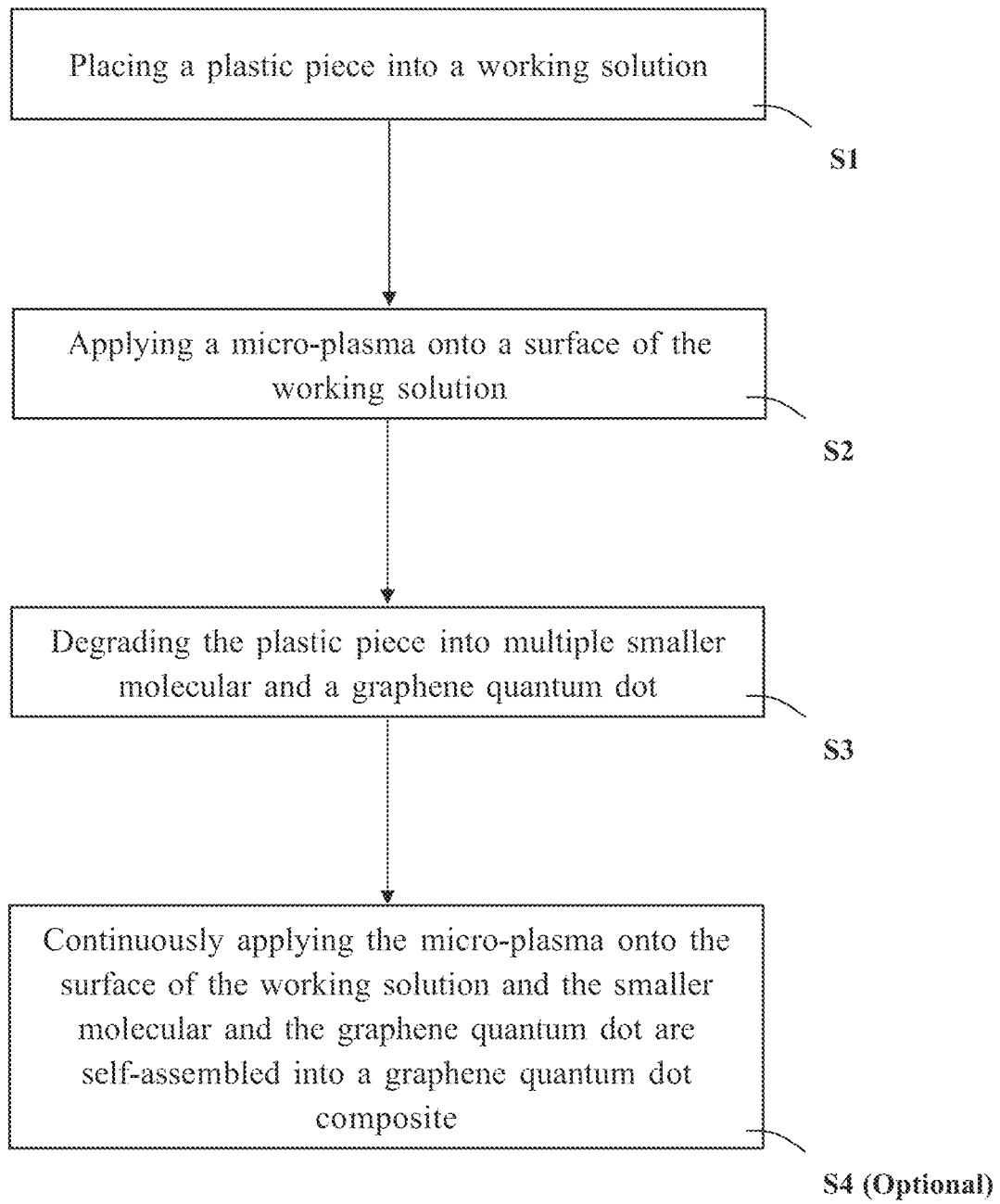
FIG. 1 is a preferred embodiment of a production method in accordance to the present invention.

Reference will now be made in detail to the present preferred embodiments of the invention, examples of which are illustrated in the accompanying drawings. Wherever possible, the same reference numbers are used in the drawings and the description to refer to the same or like parts. It is not intended to limit the method by the exemplary embodiments described herein. In the following detailed description, for purposes of explanation, numerous specific details are set forth in order to attain a thorough understanding of the disclosed embodiments. It will be apparent, however, that one or more embodiments may be practiced without these specific details. As used in the description herein and throughout the claims that follow, the meaning of "a", "an", and "the" may include reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to.

With reference to FIG. 1, the present invention herein provides a preferred embodiment for processing a plastic piece (more preferable to be a plastic waste) by micro plasma treatment with steps as following:

S1) Step 1: placing a plastic piece (P) into a working solution (20);

S2) Step 2: applying a micro-plasma onto a surface of the working solution (20);

S3) Step 3: degrading the plastic piece (P) into multiple smaller molecule (M) including but not limited to monomers, oligomers or derivatives and a graphene quantum dot (QD);

S4) Step 4 (optional): continuously applying the micro-plasma onto the surface of the working solution (20) and the smaller molecule (M) and the graphene quantum dot (QD) are self-assembled into a graphene quantum dot composite (QDC) by the micro-plasma.

Figure 2:
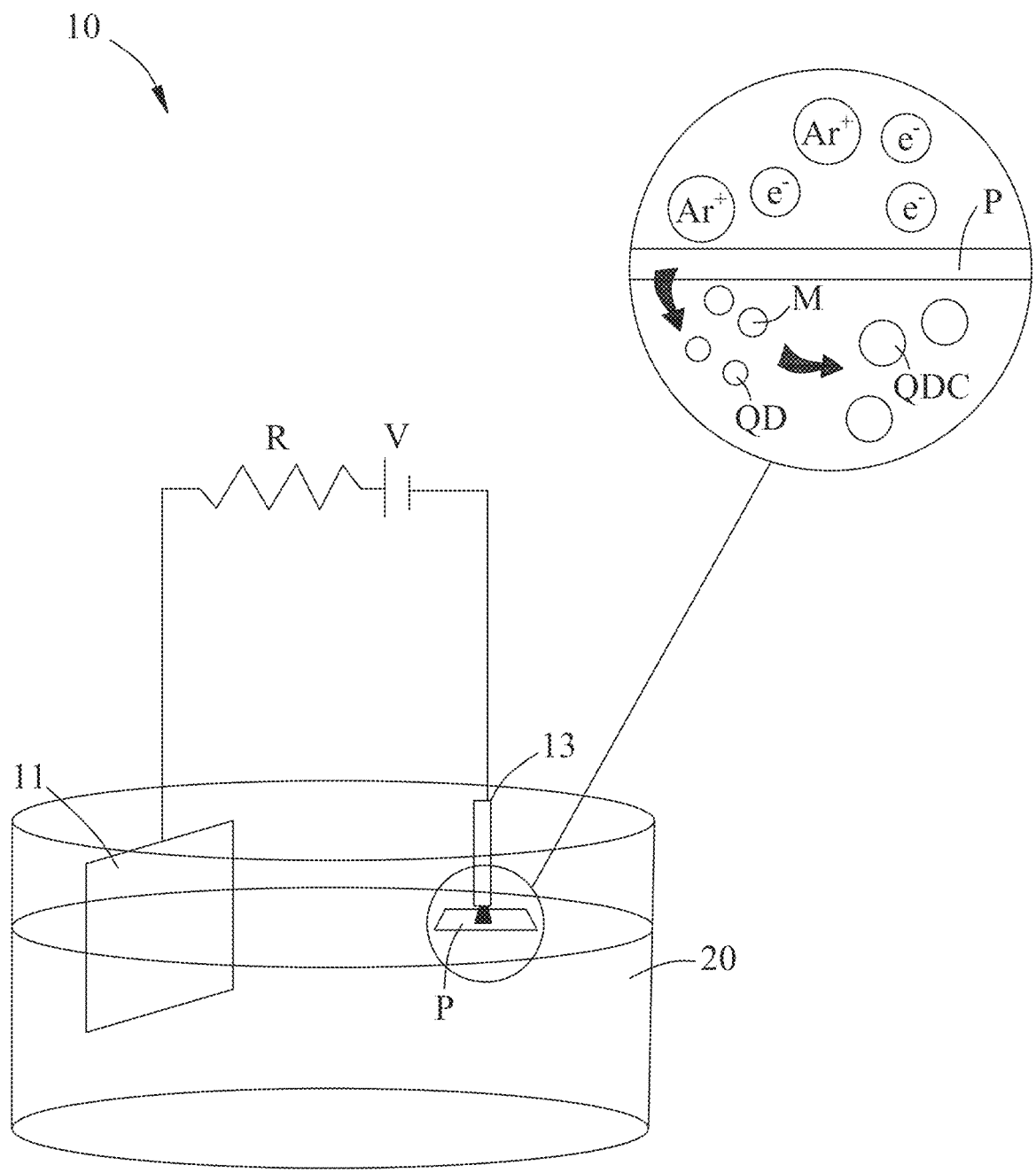
FIG. 2 is a preferred embodiment of atmospheric pressure micro-plasma device in accordance to the present invention.
Figure 3A:
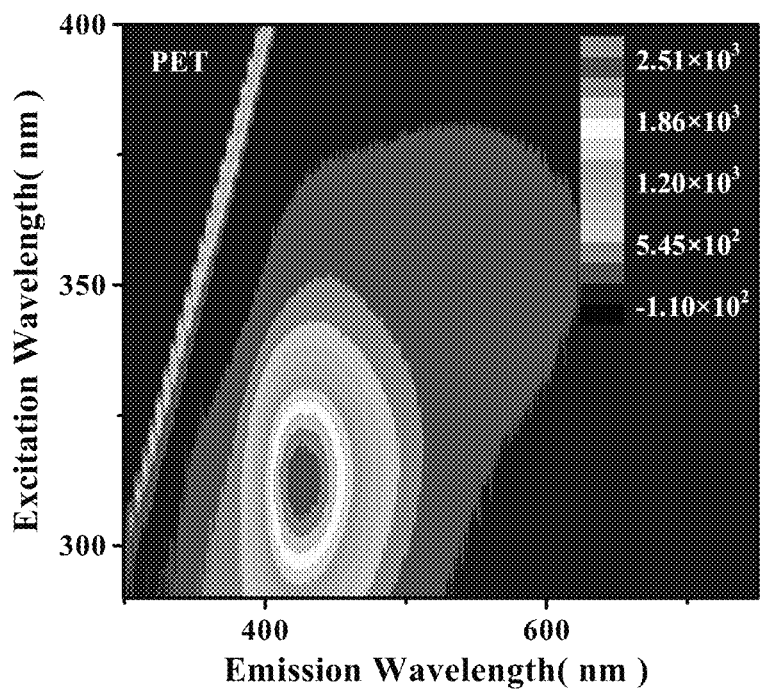
FIGS. 3A to 3H are excitation and emission maps for photoluminescence ability of samples No. 21 to 28 degraded from different plastic piece in accordance to the present invention.
Figure 3B:
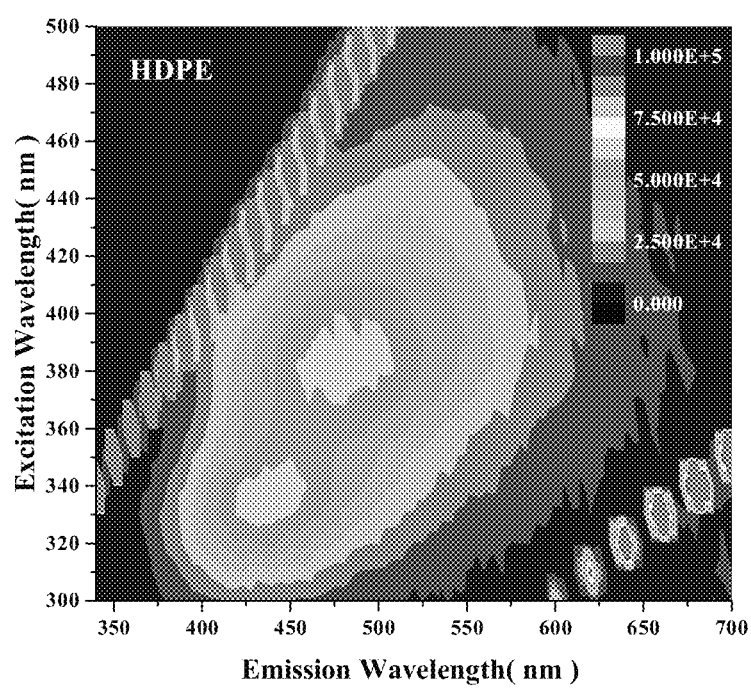
Figure 3C:
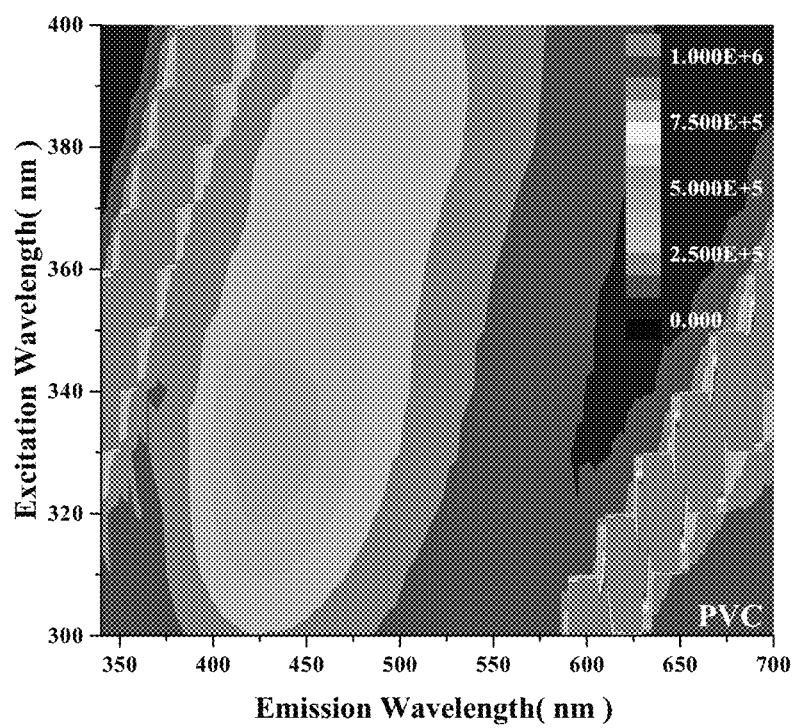
Figure 3D:
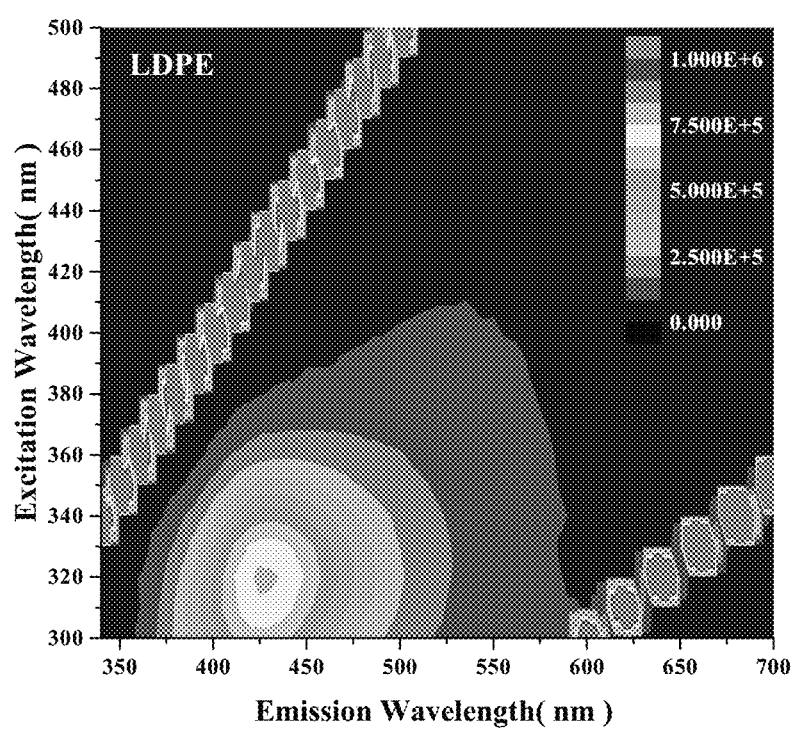
Figure 3E:
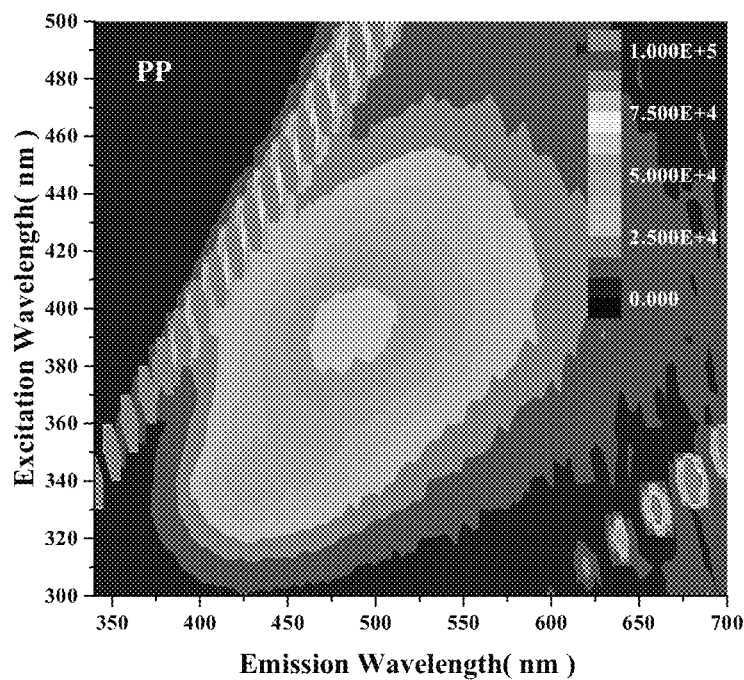
Figure 3F:
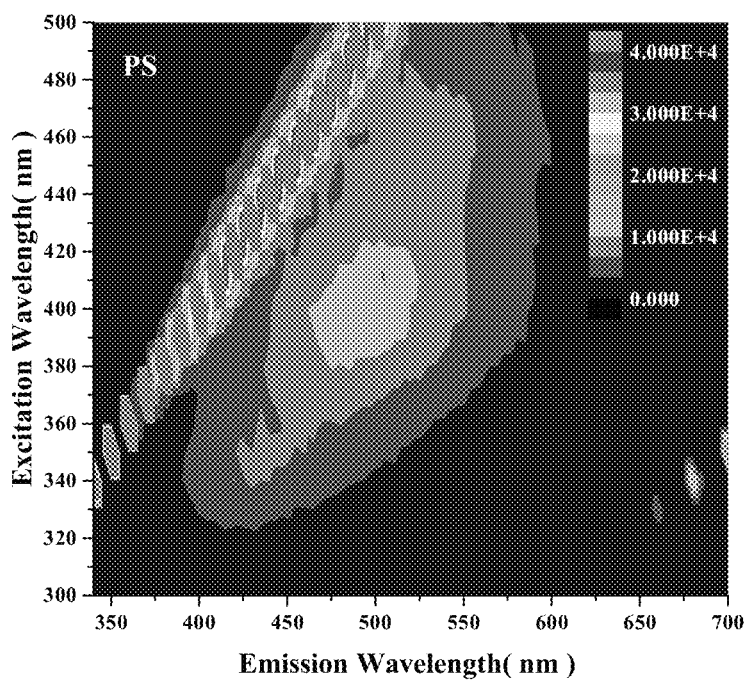
Figure 3G:
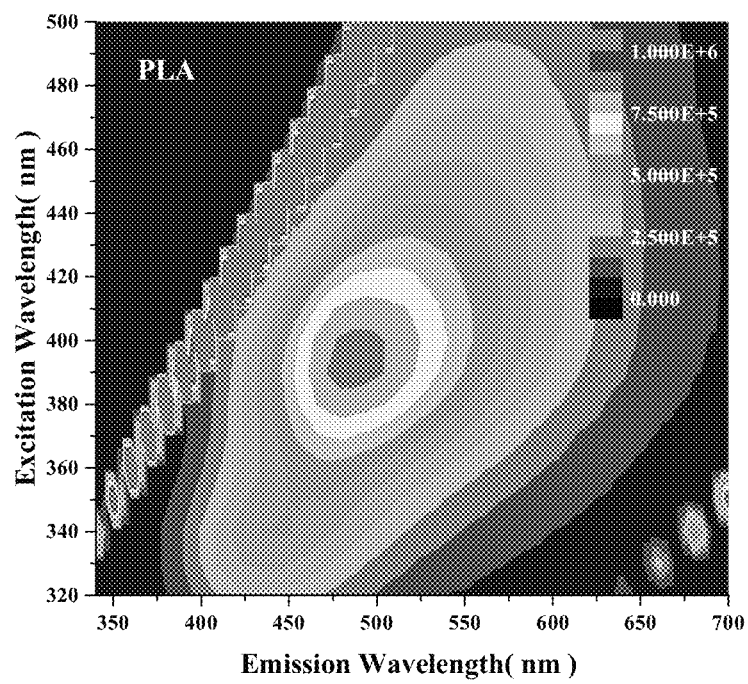
Figure 3H:
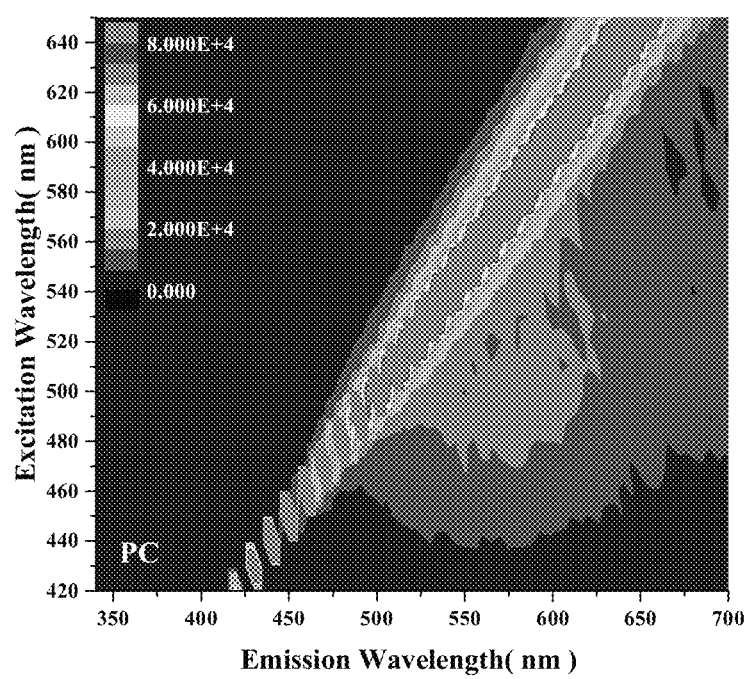
Figure 4A:
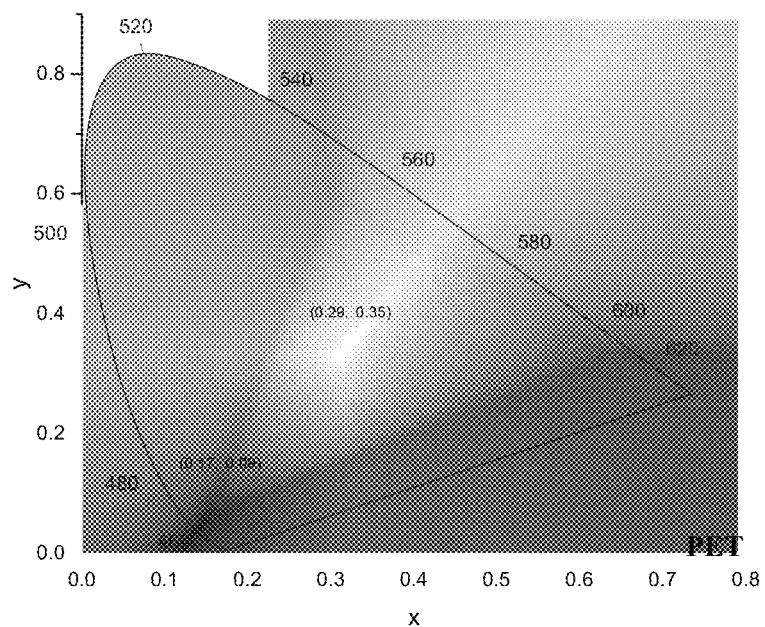
Figure 4B:
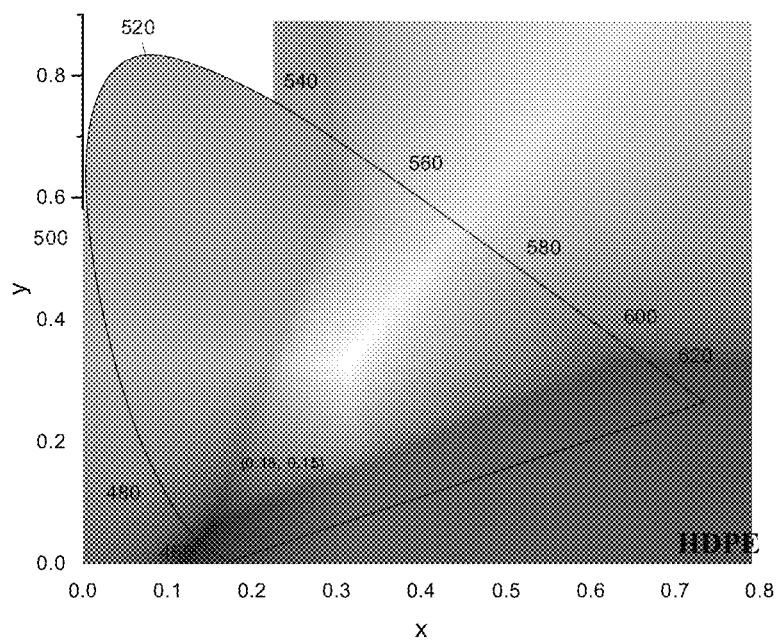
Figure 4E:
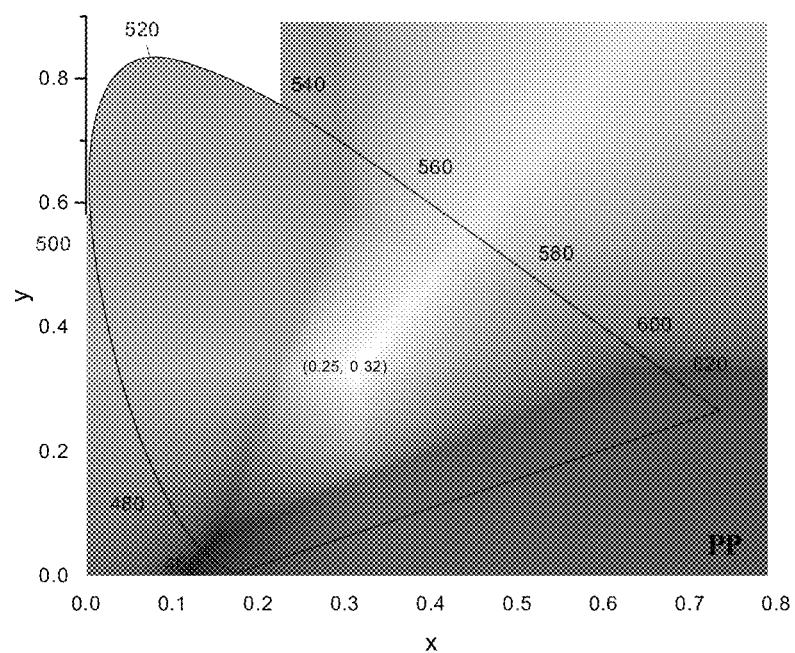
Figure 4F:
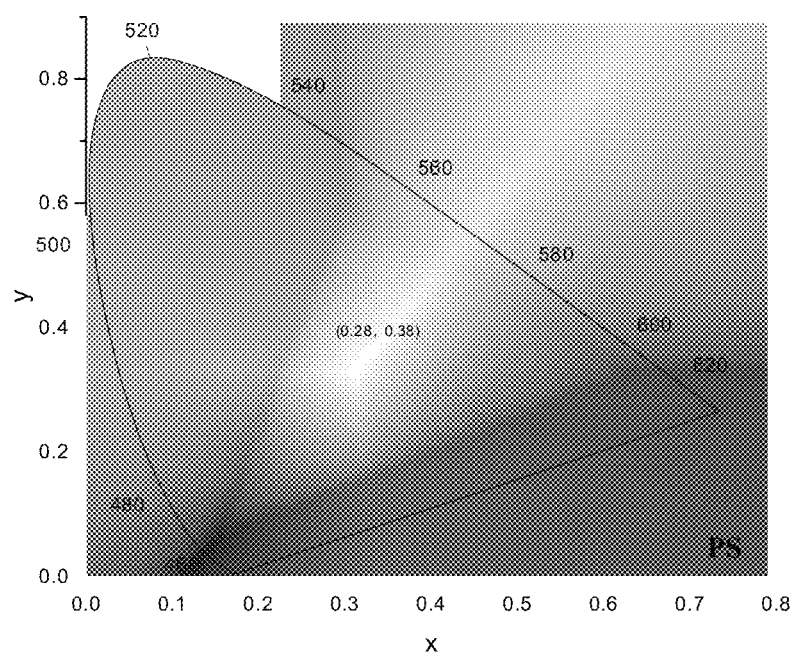
Figure 4G:
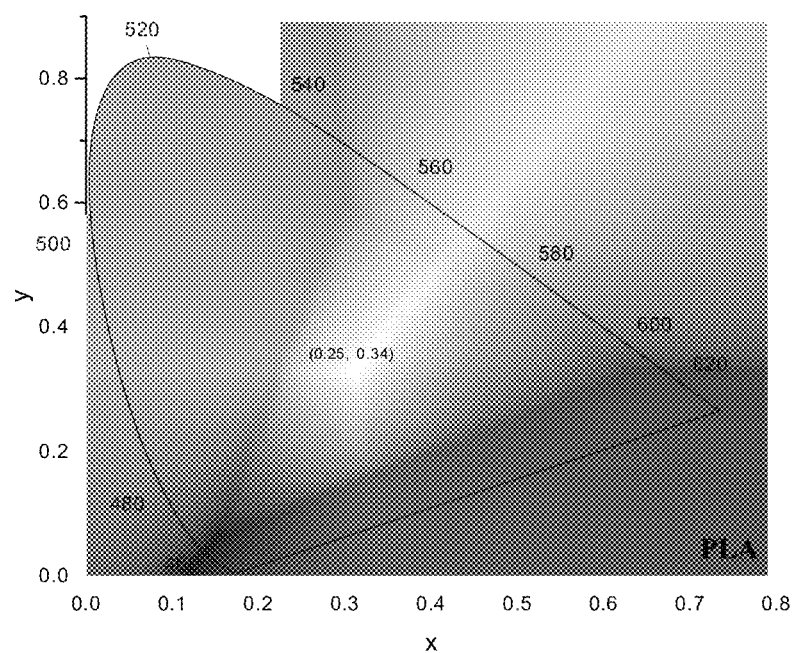
Figure 4H:
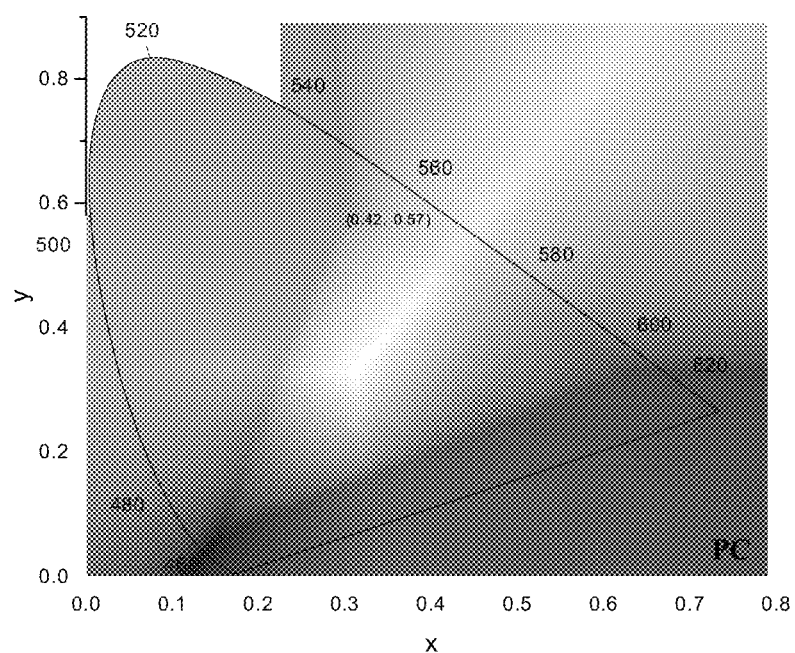
Figure 5A:
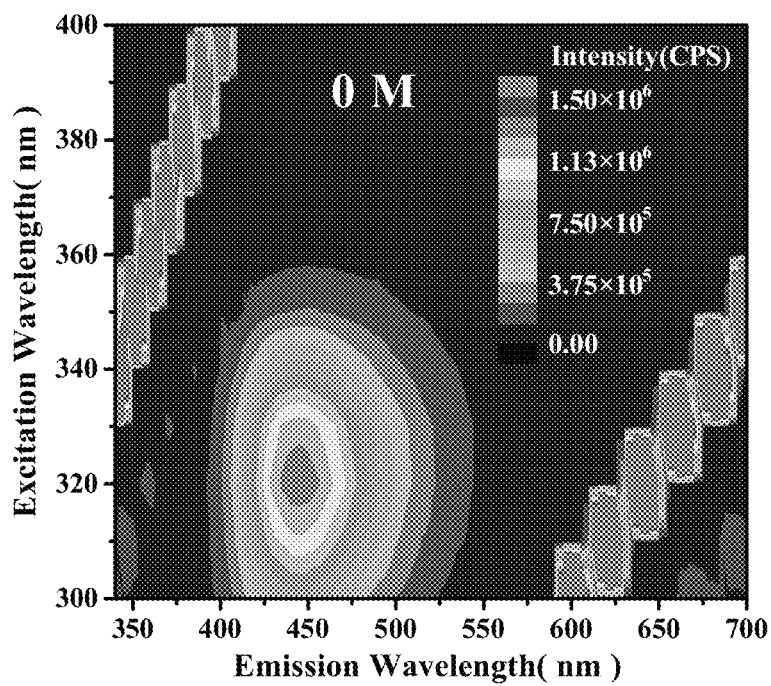
FIGS. 5A to 5E are excitation and emission maps for photoluminescence ability of samples No. 1 to 5 with different concentration of solute in the working solution in accordance to the present invention.
Figure 5B:
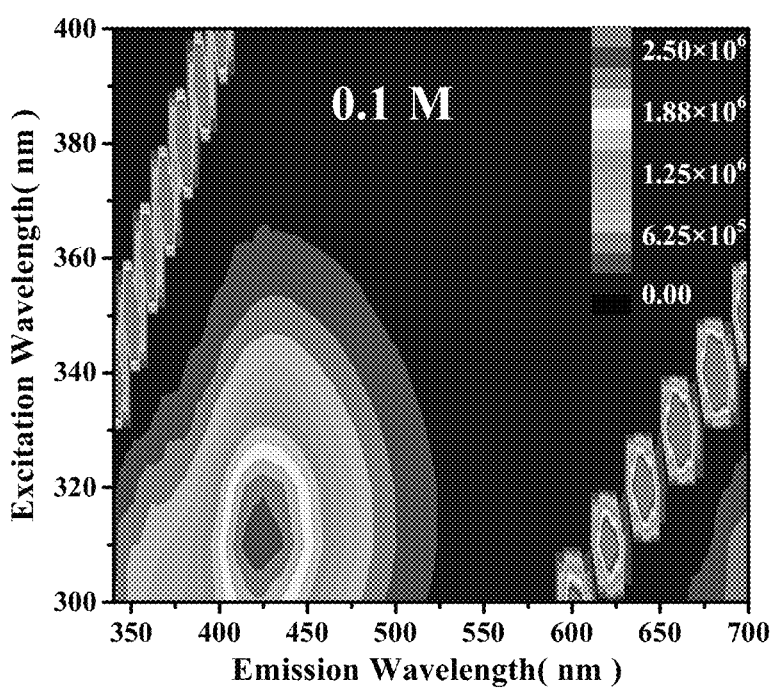
Figure 5C:
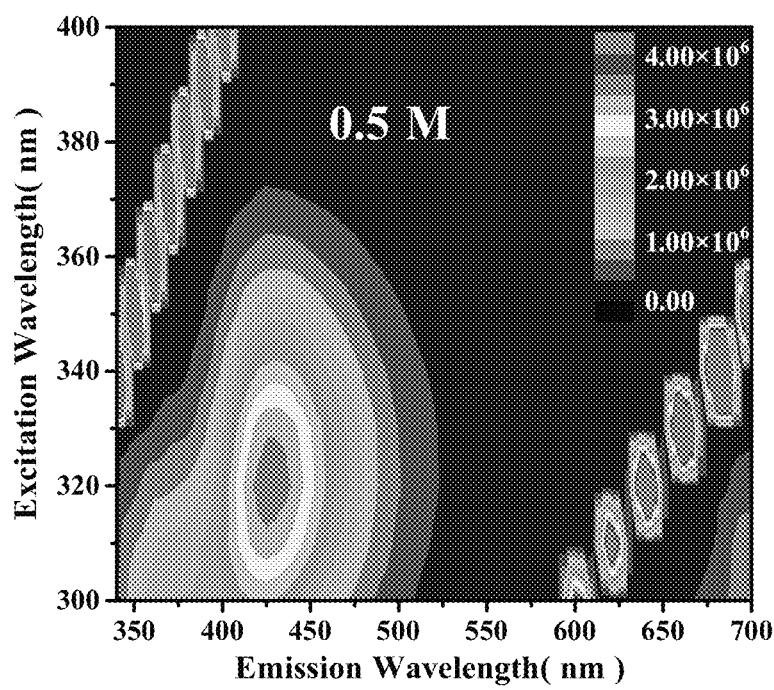
Figure 5D:
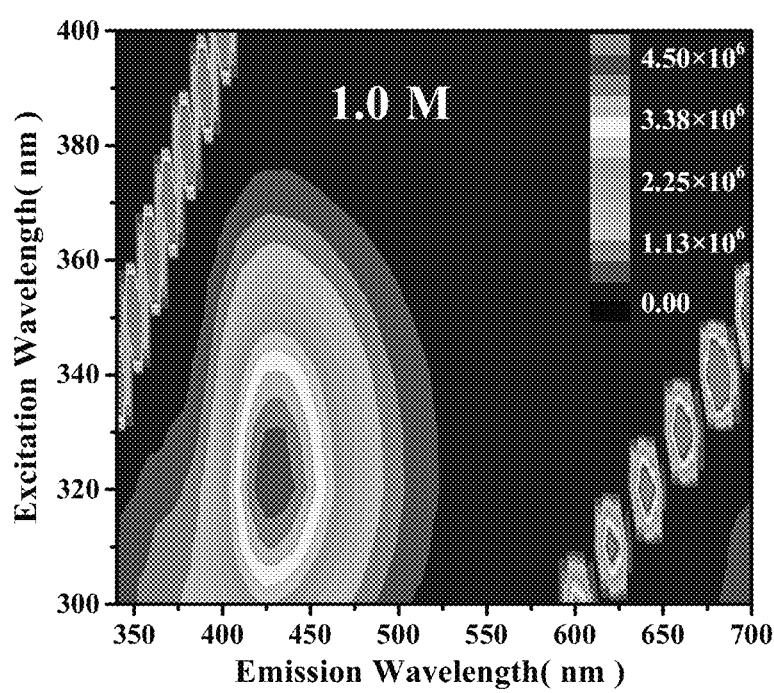
Figure 5E:
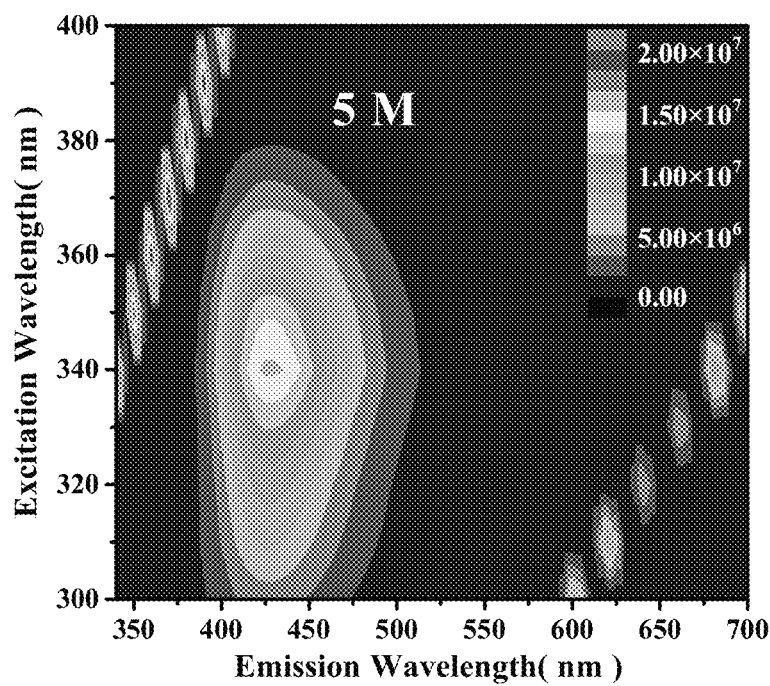
Figure 6A:
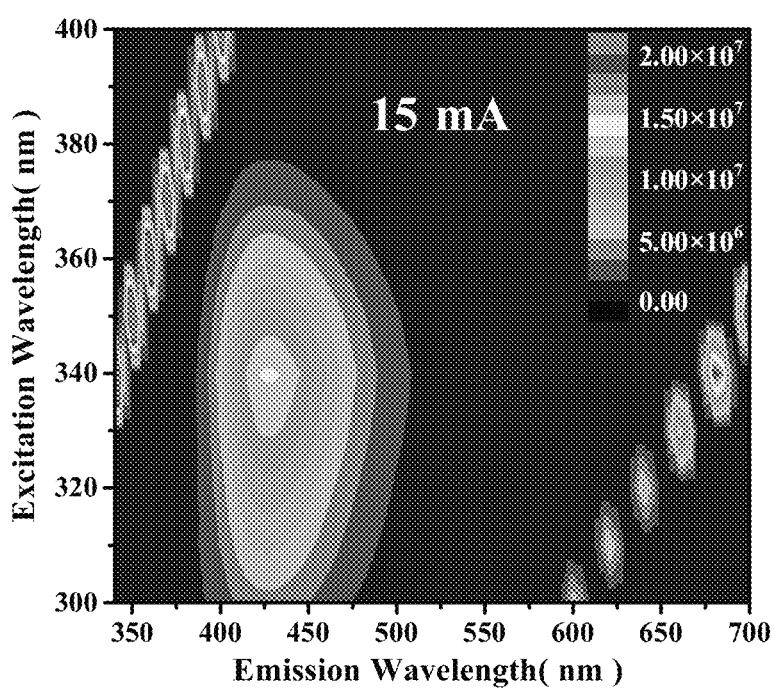
FIGS. 6A to 6E are excitation and emission maps for photoluminescence ability of samples No. 6 to 10 with different current applied by the atmospheric pressure micro-plasma device in accordance to the present invention.
Figure 6B:
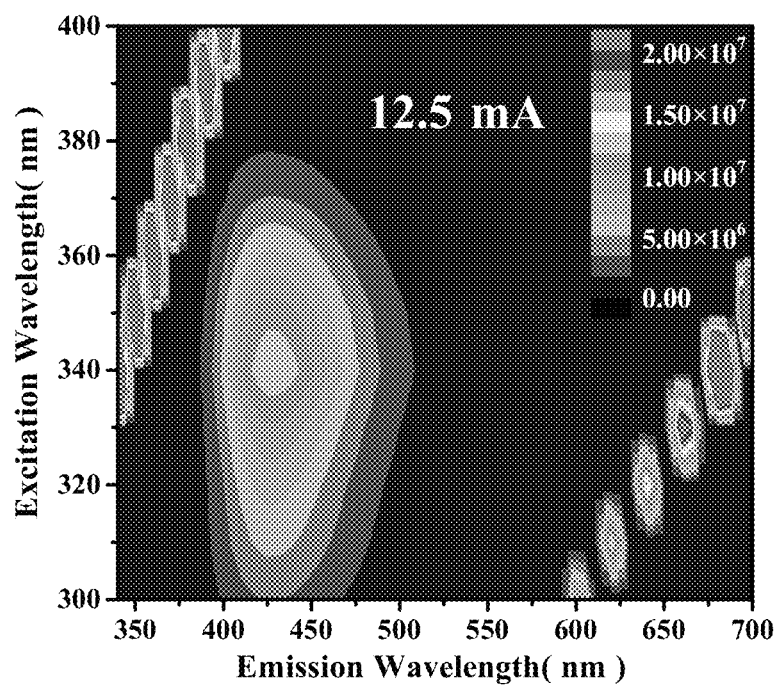
Figure 6C:
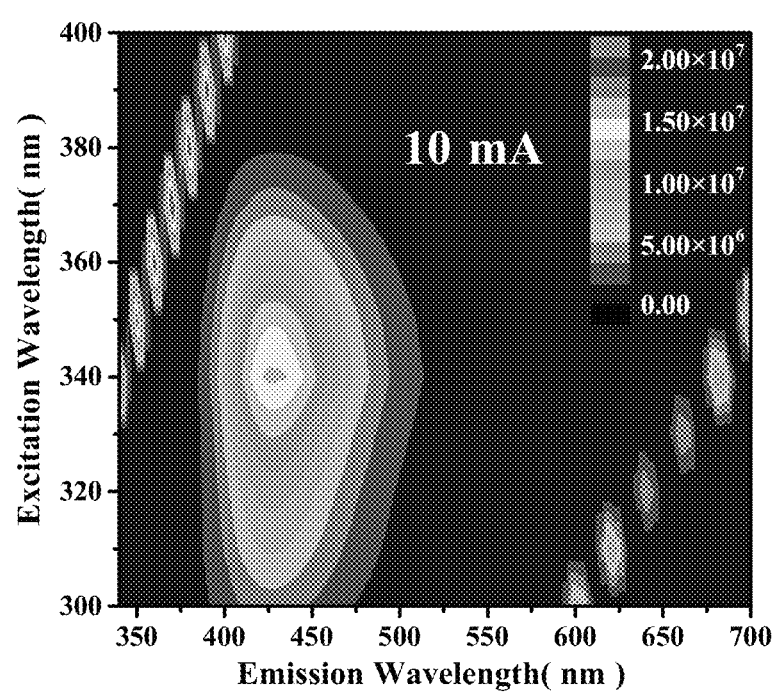
Figure 6D:
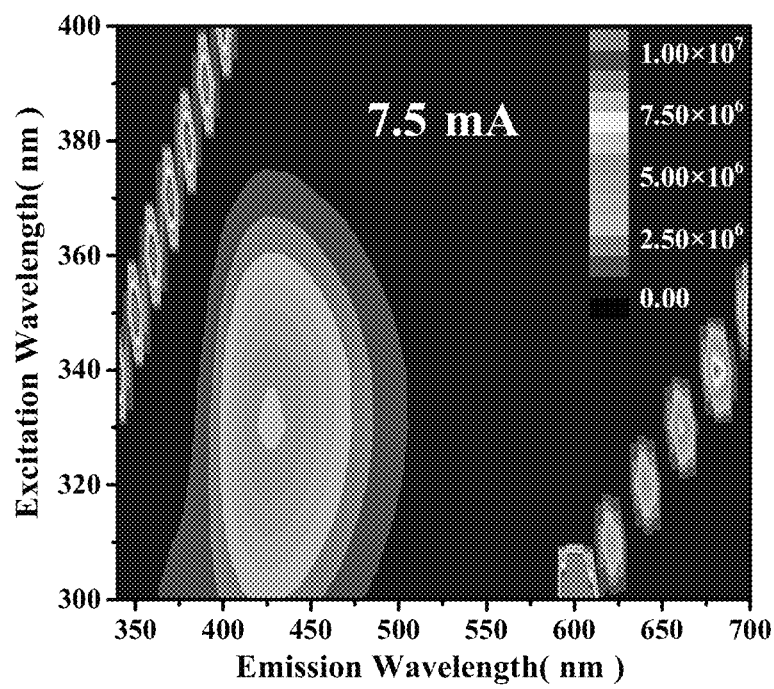
Figure 6E:
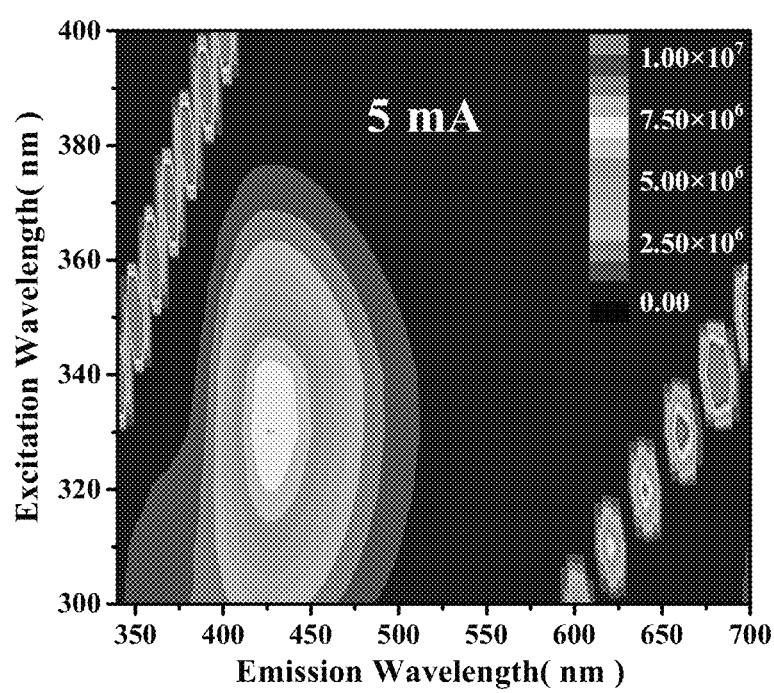
Figure 7A:
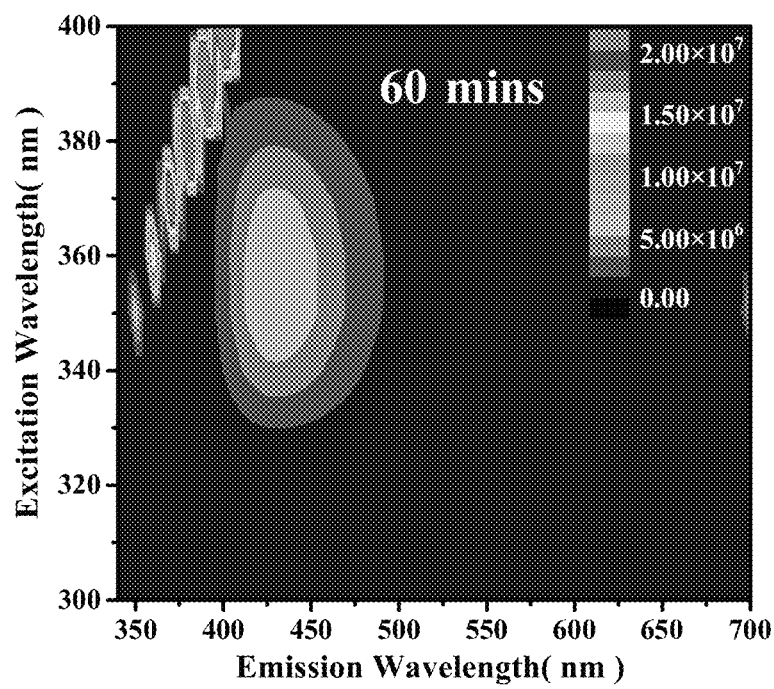
FIGS. 7A to 7E are excitation and emission maps for photoluminescence ability of samples No. 11 to 15 are shown with different processing time applied by the atmospheric pressure micro-plasma device in accordance to the present invention.
Figure 7B:
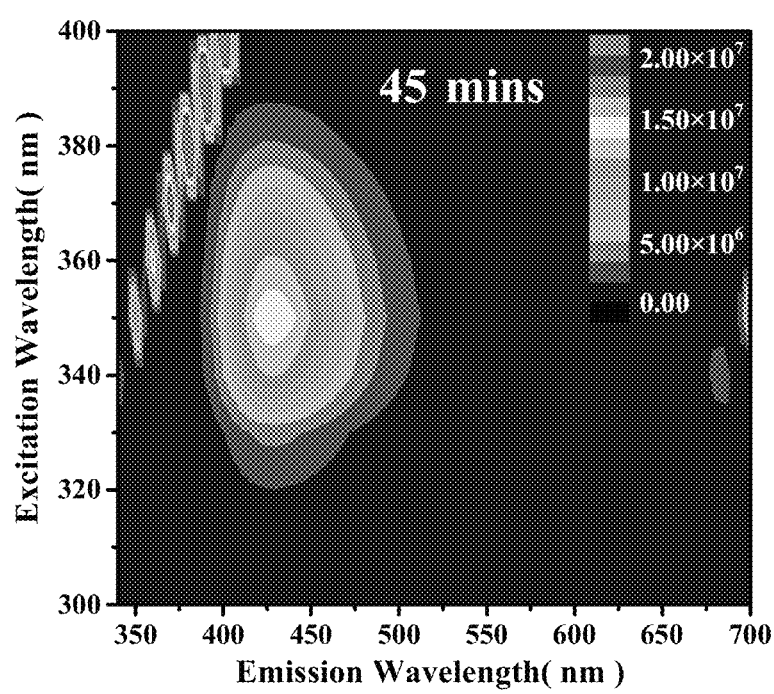
Figure 7C:
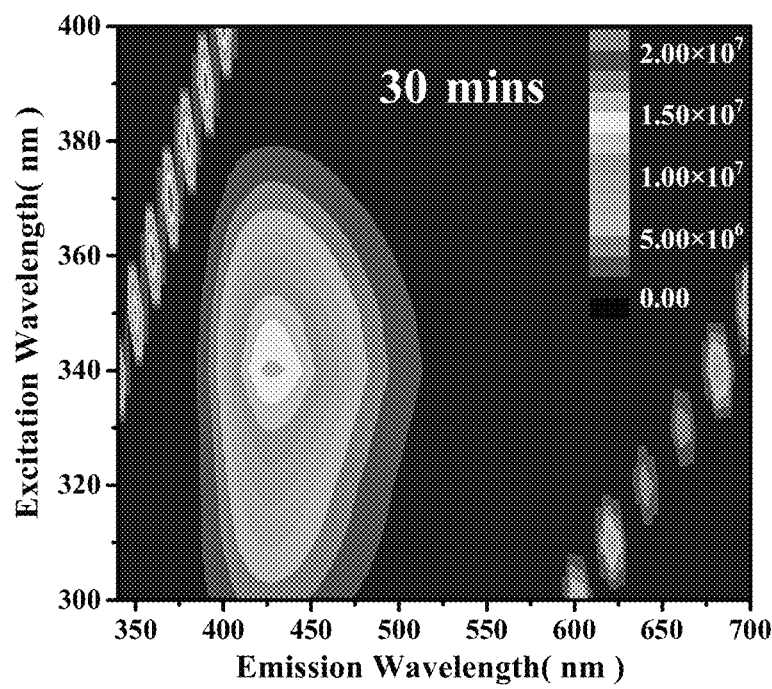
Figure 7D:
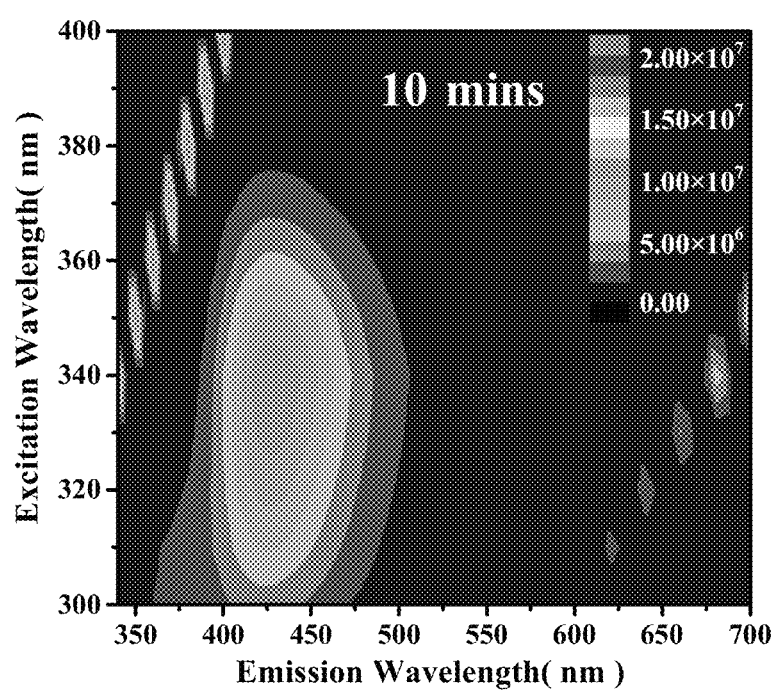
Figure 7E:
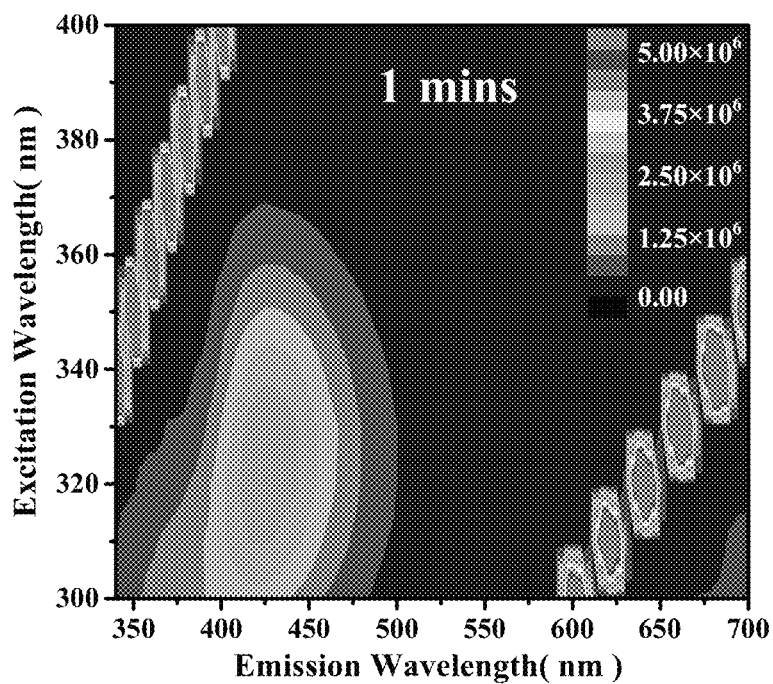
Figure 8A:
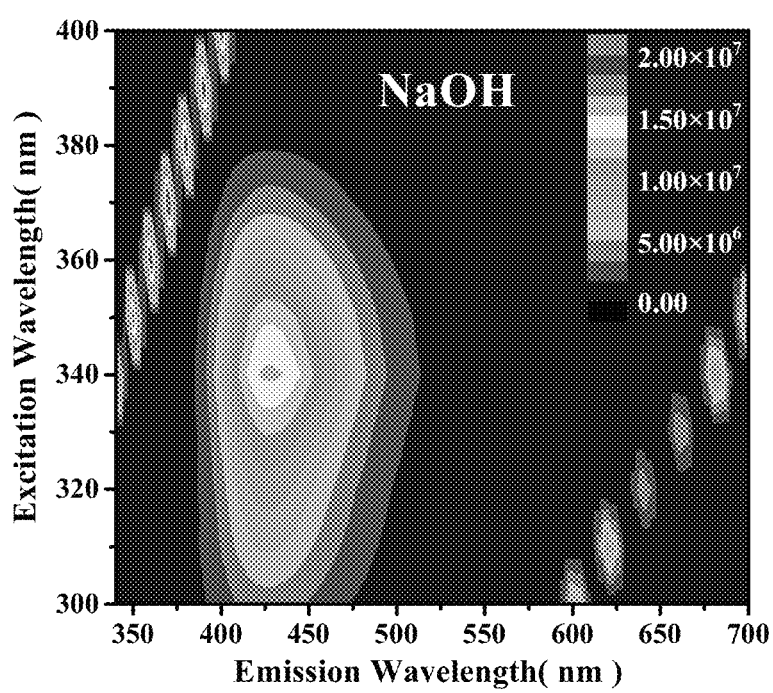
FIGS. 8A to 8E are excitation and emission maps for photoluminescence ability of samples No. 16 to 20 with different solutes in the working solution in accordance to the present invention.
Figure 8B:
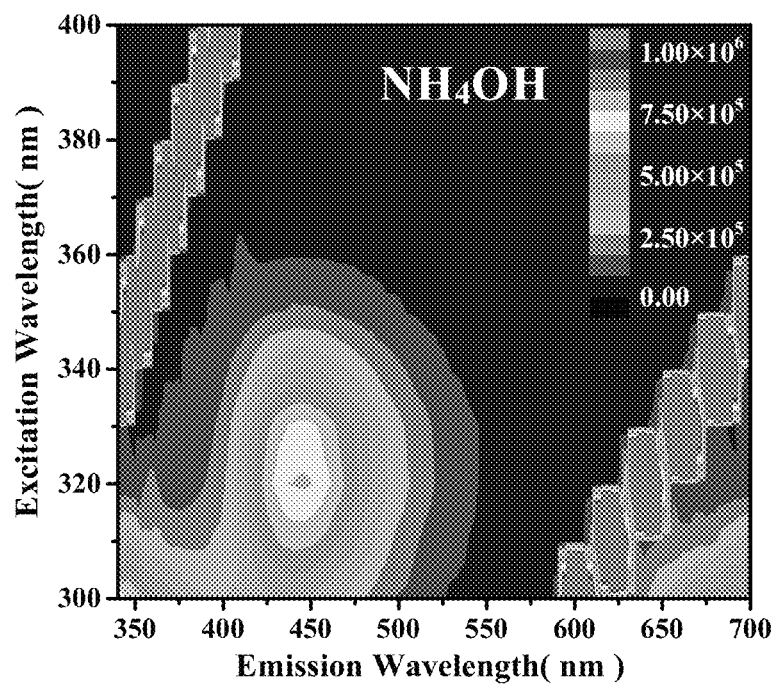
Figure 8C:
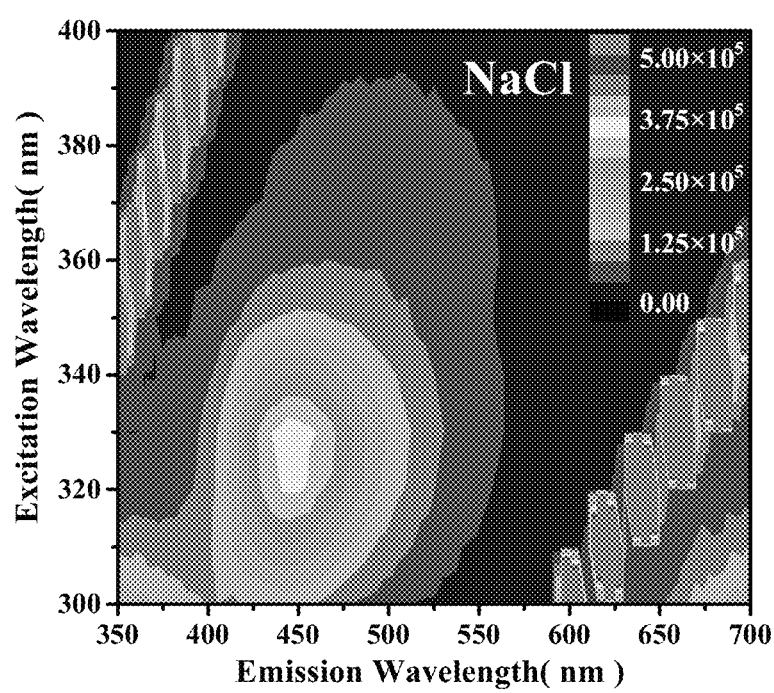
Figure 8D:
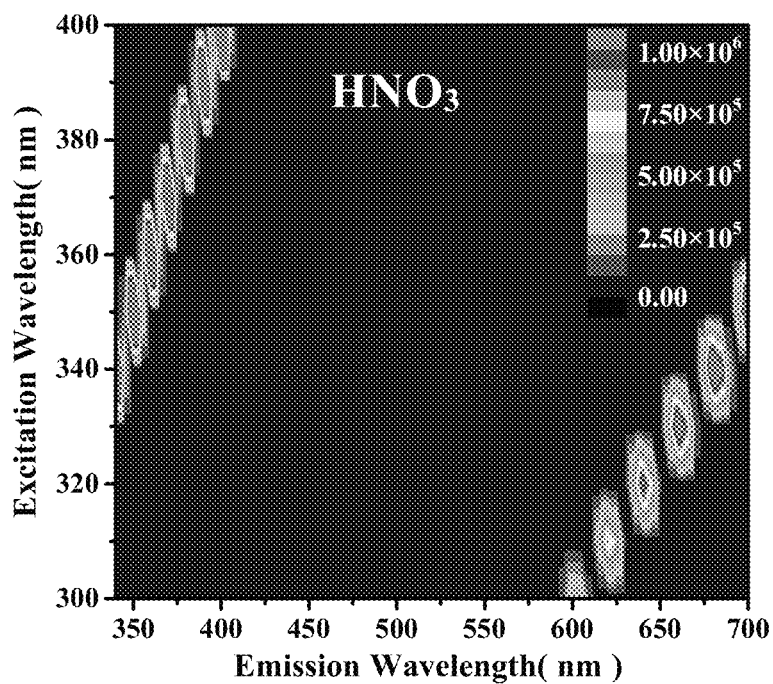
Figure 8E:
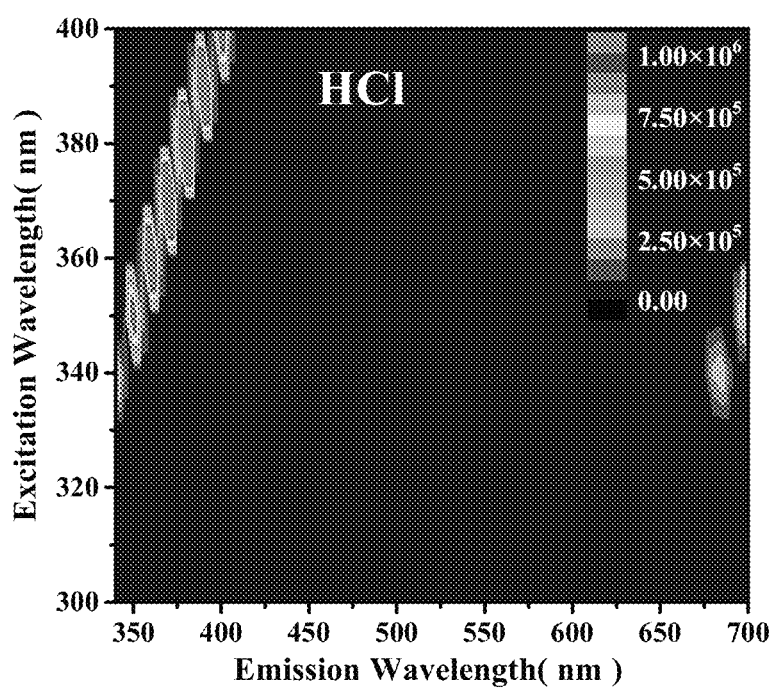

Further reference to FIG. 2, the micro-plasma being applied to the surface of the working surface is performed by atmospheric pressure micro-plasma device (10). A preferred embodiment of the said atmospheric pressure micro-plasma device (10) comprises an anode (11) and a cathode (13) immersing into the working solution (20). The anode (11) could be but not limited to a platinum plate or film. The cathode (13) in this preferred embodiment also could be but not limited to a stainless steel tube with inner diameter of the tube within 180 μm. A plasma source, eg. Argon gas is applied to the working solution (20) by the stainless steel tube of the cathode (13) as mentioned above. The plasma source is preferred to have a gas flow rate of 25 sccm, a current of 10 mA, a voltage of 2 kV and a resistance of 150 Kohm for treating the working solution (20) with the micro-plasma.

It should be reasonable and yet more understandable that the aforementioned gas flow rate, current, voltage, resistance, diameter of the tube and plasma gas type for the atmospheric pressure micro-plasma device (10) are preferred embodiment disclosed by the present invention. However, the present invention doesn't limit to particular parameters or chooses but it is applicable for all kinds of devices which could produce micro-plasma onto the working solution (20). At the meanwhile, below chart 1 also shows other preferred embodiments of the atmospheric pressure micro-plasma device (10) for actual practice.

The atmospheric pressure micro-plasma device (10) is more preferably performed at a standard atmospheric pressure (or 1 atm). The so-called micro-plasma in the present invention is referred to use a certain inner diameter of the tube of the cathode (13) which is less than 1 mm for producing small enough of micro-plasma. By applying this micro-plasma onto the surface of the working solution (20), the plastic piece (P) is able to be successfully degraded into smaller molecule (M) without any present of strong acid or alkali solvent. An energy of the micro-plasma could generate high energy electrons and reactive oxygen-containing functional groups in the working solution (20) to attack or bombard the plastic piece (P), even including a crystalline one, having the plastic piece (P) degraded into smaller molecule (M). Most importantly, one of the products of this degradation performance will generate the graphene quantum dot (QD) from the degraded plastic piece (P) at the same time. As prolonging the micro-plasma treatment, the smaller molecule (M) and the graphene quantum dot (QD) could be further self-assembled into the graphene quantum dot composite (QDC).

CHART 1

| Parameters of micro-plasma | Other suitable options |
|---|---|
| Anode | Any suitable conductors, like platinum plate or film |
| Cathode | Any suitable conductors, like stainless tube |
| Tube diameter of the cathode | ≤1 mm |
| Plasma gas source | Nitrogen($N_2$), Oxygen($O_2$), Argon(Ar) or Air |
| Gas flow rate of the plasma gas | 1~40 sccm |
| Current | 5~15 mA |
| Voltage | 1.2 kV~3 kV |
| Resistance | 150 kohm (kΩ) |

<Materials>
<Working Solution (20)>

One of the preferred embodiments of the working solution (20) in the present invention contains only water, like pure water or deionized water. However, at other preferred embodiments, the working solution (20) also contains a solvent and a very little amount of solute. The solvent can be water as mentioned before. The solute is referred to be a compound that can be dissolved in the solvent and produced at least one positive ion and one negative ion. The said solute in the present invention comprises but not limited to sodium hydroxide (NaOH), ammonia hydroxide ($NH_4OH$) or sodium chloride (NaCl). The amount of the solute in the solvent is very little which it basically doesn't cause any enormous pH changes for the working solution (20) or the solvent. For example, if the working solution (20) contains water as solvent and the sodium chloride (NaCl) as the solute. The pH value of the water normally is 7. After dissolving the sodium chloride (NaCl) into the solvent, the mole concertation of the solute in the solvent could be at a range of 0.1 to 10 M or more preferably 0.1 to 5 M to maintain the pH value of the working solution (20) at a range within 6 to 8. As the positive and negative ions came from the dissolved solute in the solvent can become carriers of the micro-plasma and facilitate the degradation and self-assembling performance of the plastic piece (M) in the working solution (20). It is worthy notice that if only use pure or deionized water as the working solution (20), the water is able to be dissolved and ionized (like $OH^-$ and $H^+$) by the micro-plasma for achieving the above-mentioned functions.

<Plastic piece (P) and smaller molecule (M)>

In the present invention, multiple options are available for the plastic piece (P). Ideally, the plastic piece (P) is thermoplastic material including but not limited to polyethylene terephthalate (PET), polyvinyl chloride (PVC), polypropylene (PP), polystyrene (PS), polylactic acid (PLA), polycarbonate (PC) or polyethylene (PE). The PE could also contain high density polyethylene (HDPE) or low density polyethylene (LDPE).

Types of the smaller molecule (M) depends on the types of the plastic material of the plastic piece (P). The smaller molecule (M) is a smaller compound compared to the plastic material which can be but not limited to monomers, oligomers or derivatives came from degradation of the plastic material. It can be primary, secondary, tertiary or quaternary polyacid, polyol or polyamine. Take PET as an example, the products came from degradation of PET by micro-plasma treatment provided in the present invention contains 2-hydroxyterephthalic acid and most importantly the graphene quantum dot (QD) with possible 2-hydroxyterephthalic acid@graphene quantum dot composite if applied by further micro-plasma treatment.

<Photoluminescence ability of the smaller molecule (M)>

The smaller molecule (M) obtained by the present invention including graphene quantum dot (QD) and the graphene quantum dot composite (QDC) both have photoluminescence ability.

With reference to blow Chart 2, multiple preferred embodiment of the present invention are provided with same 2 kV voltage, argon plasma gas and water as solvent in the working solution (20).

CHART 2

| Sample No. | Type of Plastic material | Current (mA) | Working time (mins) | The solute | Concentration of the solute (M) |
|---|---|---|---|---|---|
| 1 | PET | 10 | 30 | NaOH | 0 (pure water) |
| 2 | PET | 10 | 30 | NaOH | 0.1 |
| 3 | PET | 10 | 30 | NaOH | 0.5 |
| 4 | PET | 10 | 30 | NaOH | 1 |
| 5 | PET | 10 | 30 | NaOH | 5 |
| 6 | PET | 15 | 30 | NaOH | 5 |
| 7 | PET | 12.5 | 30 | NaOH | 5 |
| 8 (same as above No. 5) | PET | 10 | 30 | NaOH | 5 |
| 9 | PET | 7.5 | 30 | NaOH | 5 |
| 10 | PET | 5 | 30 | NaOH | 5 |
| 11 | PET | 10 | 60 | NaOH | 5 |
| 12 | PET | 10 | 45 | NaOH | 5 |
| 13 (same as above No. 5) | PET | 10 | 30 | NaOH | 5 |
| 14 | PET | 10 | 10 | NaOH | 5 |
| 15 | PET | 10 | 1 | NaOH | 5 |
| 16 (same as above No. 5) | PET | 10 | 30 | NaOH | 5 |
| 17 | PET | 10 | 30 | $NH_4OH$ | 5 |
| 18 | PET | 10 | 30 | NaCl | 5 |
| 19 | PET | 10 | 30 | HCl (Control sample) | 5 |
| 20 | PET | 10 | 30 | HNO3 (Control sample) | 5 |
| 21 (same as above No. 5) | PET | 10 | 30 | NaOH | 5 |
| 22 | HDPE | 10 | 30 | NaOH | 5 |
| 23 | PVC | 10 | 30 | NaOH | 5 |
| 24 | LDPE | 10 | 30 | NaOH | 5 |
| 25 | PP | 10 | 30 | NaOH | 5 |
| 26 | PS | 10 | 30 | NaOH | 5 |
| 27 | PLA | 10 | 30 | NaOH | 5 |
| 28 | PC | 10 | 30 | NaOH | 5 |
| 29 | PET | 10 | 10 | NaOH | 1 |
| 30 | HDPE | 10 | 10 | NaOH | 1 |
| 31 | PVC | 10 | 10 | NaOH | 1 |
| 32 | LDPE | 10 | 10 | NaOH | 1 |
| 33 | PP | 10 | 10 | NaOH | 1 |
| 34 | PS | 10 | 10 | NaOH | 1 |
| 35 | PLA | 10 | 10 | NaOH | 1 |
| 36 | PC | 10 | 10 | NaOH | 1 |

The embodiments in the above chart 2 are all applicable to the atmospheric pressure micro-plasma device (10) disclosed by the present invention and have the promising results of degradation pattern for the treated plastic piece (P) and obtain the smaller molecule (M), the graphene quantum dot (QD) and the graphene quantum dot composite (QDC). Especially to the graphene quantum dot (QD) and the graphene quantum dot composite (QDC), these two materials have the photoluminescence ability (PL ability) which the products could show light with different kinds of colors depended on different types of plastic material.

Further discussing in below chart 3, samples No. 29 to 36 are demonstrated with its degradation rate and PL ability. As shown in chart 3, the present invention is able to degrade various kinds of plastic material including the crystalline plastic like PLA to obtain the products with PL ability. The degradation rate by using the atmospheric pressure micro-plasma device (10) provided by the present invention is fast without utilizing any strong acid, alkali or enzyme and a productivity rate of the degradation products could reach 100% (which means the plastic piece (P) could be 100% degraded) if given enough processing time.

CHART 3

| Sample No. | Degradation rate (mg/min) | PL Mapping (Ex., Em.) | CIE Chromaticity Coordinates | Color of PL material |
|---|---|---|---|---|
| 21 | 0.72 | (375, 430) (345, 540) | (0.17, 0.09) (0.29, 0.35) | Blue, white |
| 22 | 2.43 | (340, 445) (390, 500) | (0.20, 0.21) (0.24, 0.31) | Blue, Cyan |
| 23 | 1.54 | (330, 425) | (0.20, 0.20) | Blue |
| 24 | 0.46 | (320, 425) | (0.18, 0.15) | Blue |
| 25 | 3.68 | (390, 485) | (0.25, 0.32) | Cyan |
| 26 | 2.91 | (400, 490) | (0.28, 0.38) | Green |
| 27 | 1.32 | (390, 485) | (0.25, 0.34) | Cyan |
| 28 | 0.37 | (490, 530) | (0.42, 0.57) | Yellow |

With reference to FIGS. 3A to 3H, excitation and emission maps for photoluminescence and corresponded CIE chromaticity coordinates in FIGS. 4A to 4H of samples No. 21 to 28 degraded from different plastic piece (P) are shown. Take sample No. 21 as an example, the excitation and emission map for photoluminescence of the degraded products from PET plastic material shows clear signal under excitation wavelength of 365 nm with corresponded (0.31, 0.35) of the CIE 1931 chromaticity coordinates which is much close to (0.33,0.33) the coordinates for pure white light. In this case, the degraded product came from PET obtained by the present invention is considered a white PL material and could be further applied to relative usage of white light. The other samples shows different colors of PL ability according to different kinds of plastic material.

Further with reference to FIGS. 5A to 5E, another excitation and emission maps for photoluminescence ability of samples No. 1 to 5 with different concentration of solute in the working solution (20) are shown. First, sample No. 1 proves that the present invention could be performed by only pure water as the working solution (20) and also can make the plastic piece (P) degrade into smaller molecule (M), QD and QDC. However, samples No. 2 to 4 also show that as the amount of the solute increases, a better result could be obtained in the present invention.

According to FIGS. 6A to 6E, yet another excitation and emission maps for photoluminescence ability of samples No. 6 to 10 with different current applied by the atmospheric pressure micro-plasma device (10) are shown. The results show that as the applied current increase, almost same result could be obtained by the present invention.

With reference to FIGS. 7A to 7E, another excitation and emission maps for photoluminescence ability of samples No. 11 to 15 are shown with different processing time applied by the atmospheric pressure micro-plasma device (10). The results show that an optimized processing time of the present invention is within 30 minutes. A longer processing time such as 45 or 60 minutes although show degradation pattern to the plastic piece (P) but the results aren't as promising as shorter time as aforementioned.

With reference to FIGS. 8A to 8E, another excitation and emission map for photoluminescence ability of samples No. 16 to 20 are shown with different solutes in the working solution (20). Samples No. 19 and 20 with the solute as $Na_4OH$ and NaOH could have a better efficiency of obtaining PL material which could conclude that the present invention is more preferably performed under neutral to alkaline solute dissolved in the working solution (20).

The present invention further discusses the adjustments for the parameters of the atmospheric pressure micro-plasma device (10) to see if different results could be obtained. The results are obtained by setting the processing time fixed as 10 minutes, the solute to be NaOH with 5 M concentration and the plasma gas to be Argon.

Figure 9A:
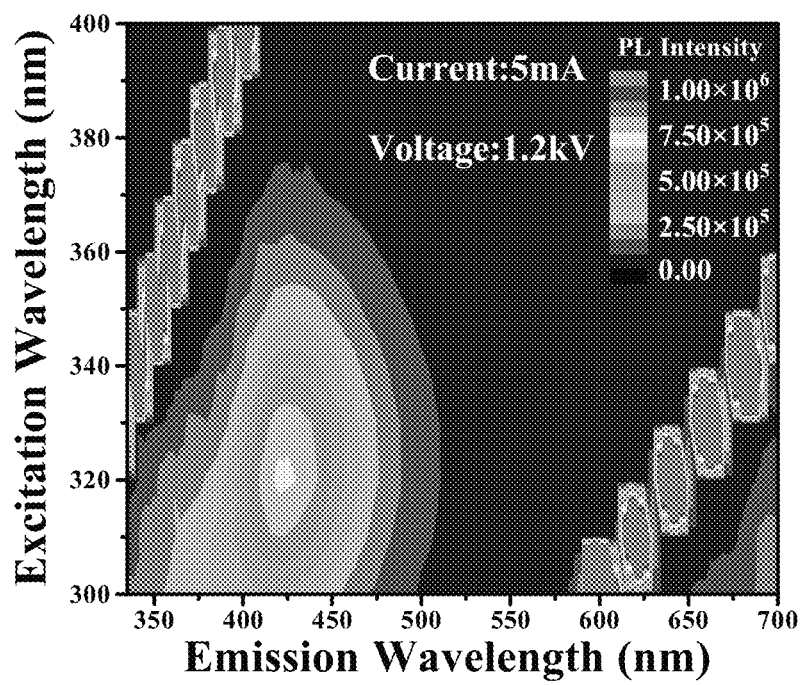
FIGS. 9A to 9B are excitation and emission maps for photoluminescence ability of samples No. 42 to 43 by applied different voltage to the working solution in accordance to the present invention.
Figure 9B:
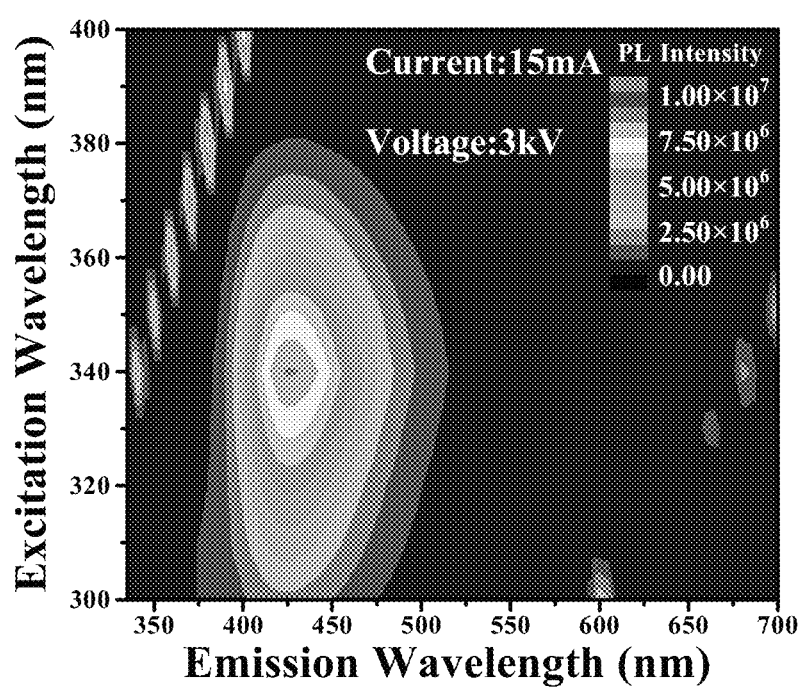

With reference to FIGS. 9A to 9B, another excitation and emission maps for photoluminescenc ability of samples No. 42 to 43 are shown by applied different voltage to the working solution (20). As the adjustments to the applied voltage, an optimized result is shown under the current to be 15 mA and the voltage to be 3 kV.

Figure 10A:
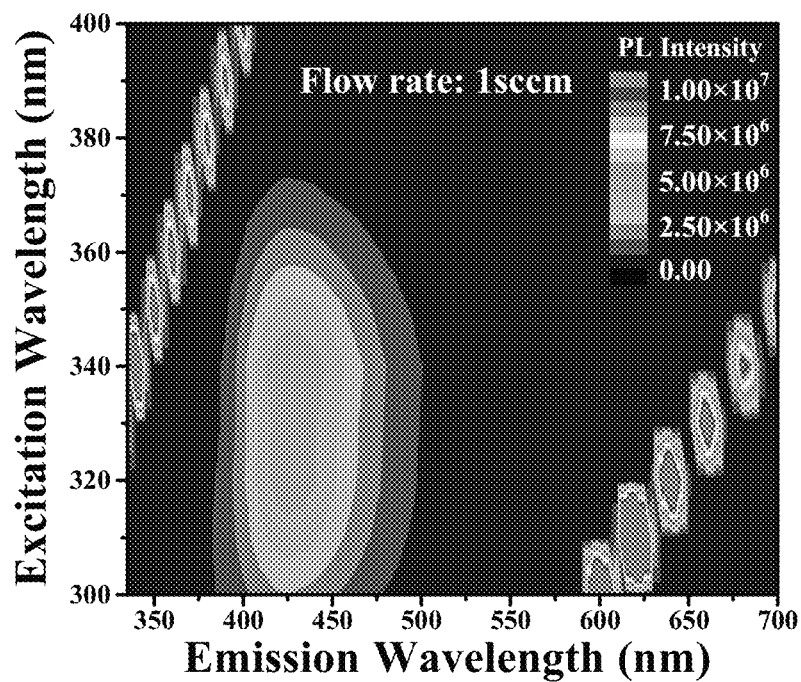
FIGS. 10A to 10C are excitation and emission maps for photoluminescence ability of samples No. 39 to 41 by applied different plasma gas flow rate to the working solution in accordance to the present invention.
Figure 10B:
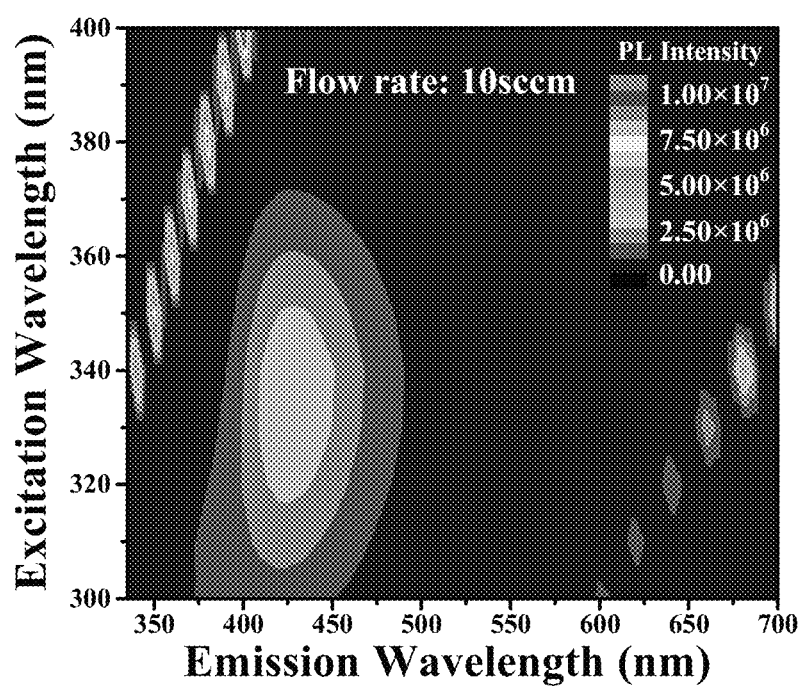
Figure 10C:
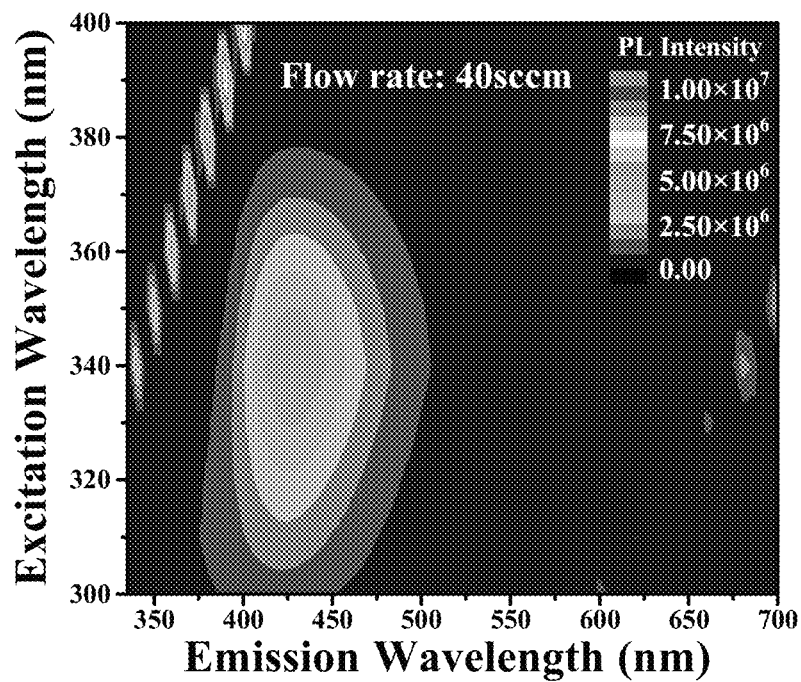

With reference to FIGS. 10A to 10C, another excitation and emission maps for photoluminescence ability of samples No. 39 to 41 are shown by applied different plasma gas flow rate to the working solution (20). The results show that the effect of gas flow rate of the plasma gas appears to be negligible in the present invention.

Figure 11A:
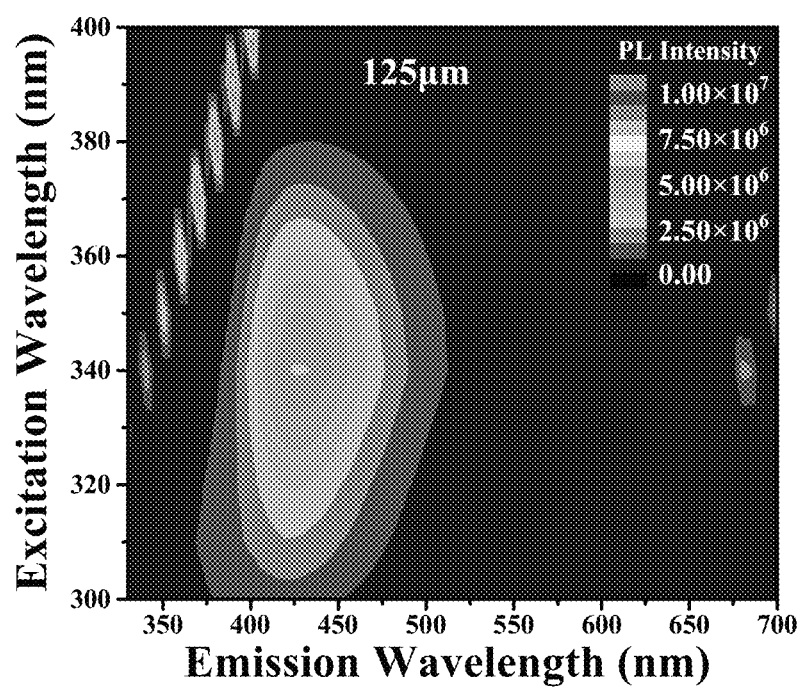
FIGS. 11A to 11B are excitation and emission maps for photoluminescence ability of samples No. 37 to 38 y using different inner diameter of cathode tube of the atmospheric pressure micro-plasma device in accordance to the present invention.
Figure 11B:
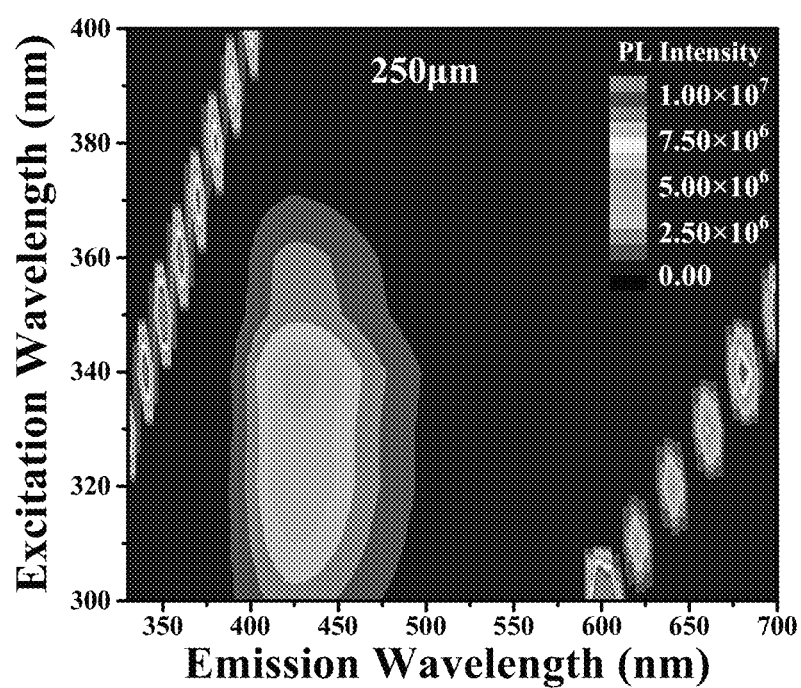

With reference to FIGS. 11A to 11B, another excitation and emission maps for photoluminescence ability of samples No. 37 to 38 are shown by using different inner diameter of cathode tube of the atmospheric pressure micro-plasma device (10). The results also show that the effect of g inner diameter of cathode tube appears to be negligible in the present invention as long as it maintain within a size capable of producing micro-plasma.

The above specification, examples, and data provide a complete description of the present disclosure and use of exemplary embodiments. Although various embodiments of the present disclosure have been described above with a certain degree of particularity, or with reference to one or more individual embodiments, those with ordinary skill in the art could make numerous alterations or modifications to the disclosed embodiments without departing from the spirit or scope of this disclosure.

What is claimed is:

1. A production method of a photoluminescence material comprising step of:
    placing a plastic piece into a working solution, and the working solution is water;
    applying a micro-plasma onto a surface of the working solution; and
    degrading the plastic piece into multiple molecule and a graphene quantum dot.

2. The production method as claimed in claim 1, wherein: after degrading the plastic piece, continuously applying the micro-plasma onto the surface of the working solution and the smaller molecule and the graphene quantum dot are self-assembled into a graphene quantum dot composite by the micro-plasma.

3. The production method as claimed in claim 1, wherein:
    the plastic piece comprises thermoplastic material including polyethylene terephthalate (PET), polyvinyl chloride (PVC), polypropylene (PP), polystyrene (PS), polylactic acid (PLA), polycarbonate (PC) or polyethylene (PE); and
    the smaller molecule comprises primary, secondary, tertiary or quaternary polyacid, polyol or polyamine.

4. The production method as claimed in claim 2, wherein:
    the plastic piece comprises thermoplastic material including polyethylene terephthalate (PET), polyvinyl chloride (PVC), polypropylene (PP), polystyrene (PS), polylactic acid (PLA), polycarbonate (PC) or polyethylene (PE); and
    the smaller molecule comprises primary, secondary, tertiary or quaternary polyacid, polyol or polyamine.

5. The production method as claimed in claim 1, wherein:
    the working solution further comprises a solute dissolved therein; and the solute comprise sodium hydroxide (NaOH), ammonia hydroxide (NH4OH) or sodium chloride (NaCl) with concentration at a range of 0.1 to 10 M.

6. The production method as claimed in claim 2, wherein:
the working solution further comprises a solute dissolved therein; and
the solute comprise sodium hydroxide (NaOH), ammonia hydroxide (NH4OH) or sodium chloride (NaCl) with concentration at a range of 0.1 to 10 M.

7. The production method as claimed in claim 3, wherein:
the working solution further comprises a solute dissolved therein; and
the solute comprise sodium hydroxide (NaOH), ammonia hydroxide (NH4OH) or sodium chloride (NaCl) with concentration at a range of 0.1 to 10 M.

8. The production method as claimed in claim 1, wherein:
the micro-plasma is applied by an atmospheric pressure micro-plasma device comprising:
an anode; and
a cathode as a tube, wherein a plasma gas is applied to the working solution by the tube with gas flow at a range of 1 to 40 sccm, resistance 150 kohm, current at a range of 5 to 15 mA and voltage at a range of 1.2 to 3 kV to form a plasma source for applying to the working solution.

9. The production method as claimed in claim 2, wherein:
the micro-plasma is applied by an atmospheric pressure micro-plasma device comprising
an anode; and
a cathode as a tube, wherein a plasma gas is applied to the working solution by the tube with gas flow at a range of 1 to 40 sccm, resistance 150 kohm, current at a range of 5 to 15 mA and voltage at a range of 1.2 to 3 kV to form a plasma source for applying to the working solution.

10. A photoluminescense material comprises:
a smaller molecule degraded from a plastic piece by micro-plasma treatment;
a graphene quantum dot; and
a graphene quantum dot composite comprises the smaller molecule and the graphene quantum dot.

11. The material as claimed in claim 10, the photoluminescence material comprises white, blue, cyan or yellow colors.

\* \* \* \* \*